(12) United States Patent
Gallagher et al.

(10) Patent No.: US 6,453,075 B1
(45) Date of Patent: Sep. 17, 2002

(54) METHOD FOR PRESERVING IMAGE DETAIL WHEN ADJUSTING THE TONE SCALE OF A DIGITAL COLOR IMAGE

(75) Inventors: Andrew C. Gallagher; Edward B. Gindele, both of Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/223,881

(22) Filed: Dec. 31, 1998

(51) Int. Cl.⁷ .................................................. G06K 9/40
(52) U.S. Cl. ...................... 382/260; 382/263; 382/264; 382/162; 358/518
(58) Field of Search ................................ 382/162, 167, 382/260, 263, 264; 358/515, 518, 520, 521

(56) References Cited

U.S. PATENT DOCUMENTS

| | | | |
|---|---|---|---|
| 5,012,333 A | 4/1991 | Lee et al. | 358/80 |
| 5,172,224 A | * 12/1992 | Collette et al. | 358/515 |
| 5,454,044 A | 9/1995 | Nakajima | 382/132 |
| 5,793,885 A | 8/1998 | Kasson | 382/167 |

FOREIGN PATENT DOCUMENTS

| | | | | |
|---|---|---|---|---|
| DE | 4126751 A1 | 8/1991 | ............ | H04N/1/40 |
| EP | 0415648 A2 | 3/1991 | ............ | G06F/15/66 |
| EP | 0525949 A2 | 2/1993 | ............ | G06F/15/68 |
| EP | 0613294 A1 | 8/1994 | ............ | H04N/5/20 |
| EP | 0849 940 A2 | 6/1998 | ............ | H04N/5/20 |
| JP | 06030330 | 2/1994 | ............ | H04N/5/243 |

OTHER PUBLICATIONS

"Automatic, Adaptive, Brightness Independent Contrast Enhancement" by F.P.Ph. De Vries. 8242 Signal Processing, Oct. 21, 1990, No. 2, Amsterdam, NL.

* cited by examiner

Primary Examiner—Thomas D. Lee
(74) Attorney, Agent, or Firm—David M. Woods (57) ABSTRACT

A method for preserving spatial detail when adjusting the tone scale of a digital color image, the method comprises receiving a digital color image; providing a tone scale function for adjusting the tone scale of the digital color image; generating a luminance signal from the digital color image; using the tone scale function and the control signal applied to each color channel of the digital color image to produce an enhanced digital color image.

6 Claims, 6 Drawing Sheets

FIG. 8

METHOD FOR PRESERVING IMAGE DETAIL WHEN ADJUSTING THE TONE SCALE OF A DIGITAL COLOR IMAGE

FIELD OF THE INVENTION

The invention relates generally to the field of digital image processing and, more particularly, to a method for preserving image detail when adjusting the tone scale of a digital color image.

BACKGROUND OF THE INVENTION

Existing methods for applying tone scales to digital color images include applying the tone scale to each of the color channels independently, applying the tone scale to the neutral channel and preserving the original pixel color difference signal, or applying the tone scale to just the low frequency image. These methods of tone scale application alter the sharpness and appearance of the color in processed images, and the latter can produce displeasing artifacts.

Traditional methods of applying a tone scale function to a digital color image modify the apparent sharpness of the image because the tone scale modifies the amplitudes of high frequency detail information. This phenomenon occurs when the tone scale function is applied to each of the color channels independently, or when the tone scale function is applied to the neutral channel and original pixel color difference signals are preserved.

In an effort to apply a tone scale function to a digital image without distorting the detail information, in U.S. Pat. No. 5,012,333, Lee et al. proposed separating the image into a high frequency and a low frequency image by using FIR filters. The tone scale function is then applied to only the low frequency image, and the high frequency image is added back to the tone scaled low frequency image.

Also, in U.S. Pat. No. 5,454,044, Nakajima suggests modifying the image contrast by the formula Sproc=Sorg+f(Sus).

The low frequency image (Sus) is passed through function f( ) which is a monotonically decreasing function. This signal is added to the original (Sorg) to create the processed image Sproc.

Both of these methods preserve the high frequencies of the image, but this may lead to the creation of unsharp mask type artifacts (overshoot and undershoot) in the neighborhood of large edges (characteristic of occlusion boundaries or dark shadows).

Consequently, a need exists for overcoming the above-described drawbacks. More specifically, a need exists for permitting the application of a tone scale function to a digital image to adjust the macro contrast of the image, preserves the high frequency detail information, and prevents artifacts in the neighborhood of large edges.

SUMMARY OF THE INVENTION

It is the object of the present invention to provide a more effective means of applying a tone scale function to a digital color image with the result that the processed image retains most of the spatial detail of the original. According to one aspect of the invention, the invention resides in a method for preserving detail when adjusting tone scale of a digital color image, the method comprising: receiving a digital color image having at least two color channels; providing a tone scale function for adjusting the tone scale of the digital color image; generating a luminance signal from the digital color image; generating a control signal derived from the luminance signal; using the tone scale function, and the control signal applied to each color channel of the digital color image to produce an enhanced digital color image.

ADVANTAGEOUS EFFECT OF THE INVENTION

The present invention has the advantage of preserving spatial detail and color edge detail while altering the tone scale of a digital color image.

DETAILED DESCRIPTION OF THE INVENTION

In the following description, the present invention will be described in the preferred embodiment as a software program. Those skilled in the art will readily recognize that the equivalent of such software may also be constructed in hardware.

Figure 1:
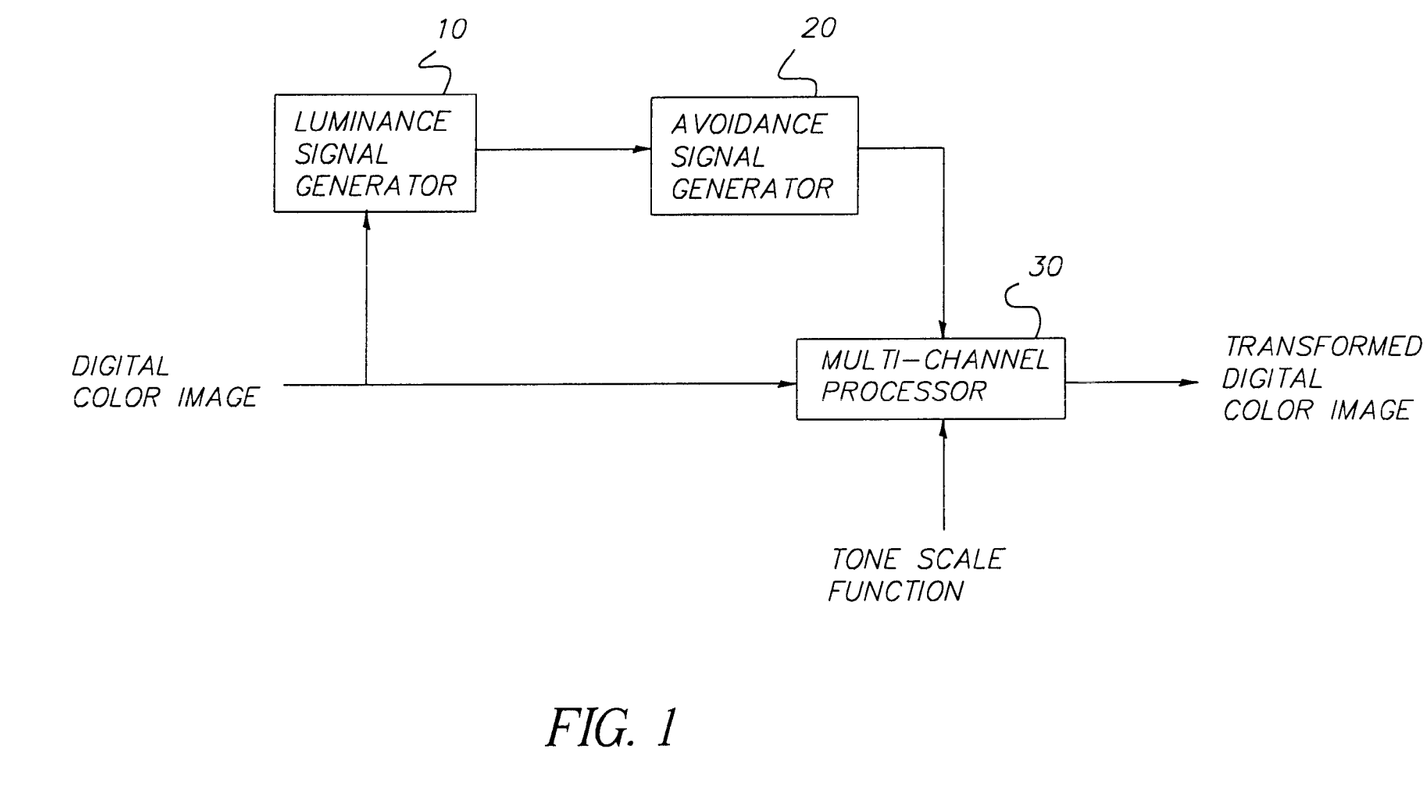
FIG. 1 is a block diagram illustrating an overview of the present invention.

Referring to FIG. 1, there is illustrated a functional block diagram of the present invention. The present invention utilizes a digital color image consisting of a collection of color channels, each corresponding to a unique color. The most common implementation of digital color images includes three image channels (red, green, and blue). Each color channel consists of a two-dimensional array of pixel values corresponding to light intensities.

A luminance signal is calculated from the color channels of the digital color image by the luminance signal generator 10. More than one method exists to produce a luminance signal from a tri-color image representation. The preferred embodiment uses a linear combination of the individual color channel pixel values to produce the luminance signal pixel value.

$$x_{ij} = \Sigma_k \alpha_k p_{kij}$$

The term $x_{ij}$ refers to the luminance value at the spatial coordinates represented by indices i and j. The term $p_{kij}$ refers to the pixel value at the same spatial coordinate for the $k^{th}$ color channel. The term $\alpha_k$ refers to the weighting factor for the $k^{th}$ color channel. The preferred embodiment uses ($\alpha_k$ values of 0.30, 0.59, and 0.11 respectively for the red, green, and blue image channels weighting factors.

The avoidance signal is calculated from the luminance signal by the avoidance signal generator 20. The multi-channel processor produces the output transformed color image from the avoidance signal, the tone scale function, and the original digital color image. This output signal of the avoidance signal generator 20 will from now on be referred to as a(L).

Figure 2:
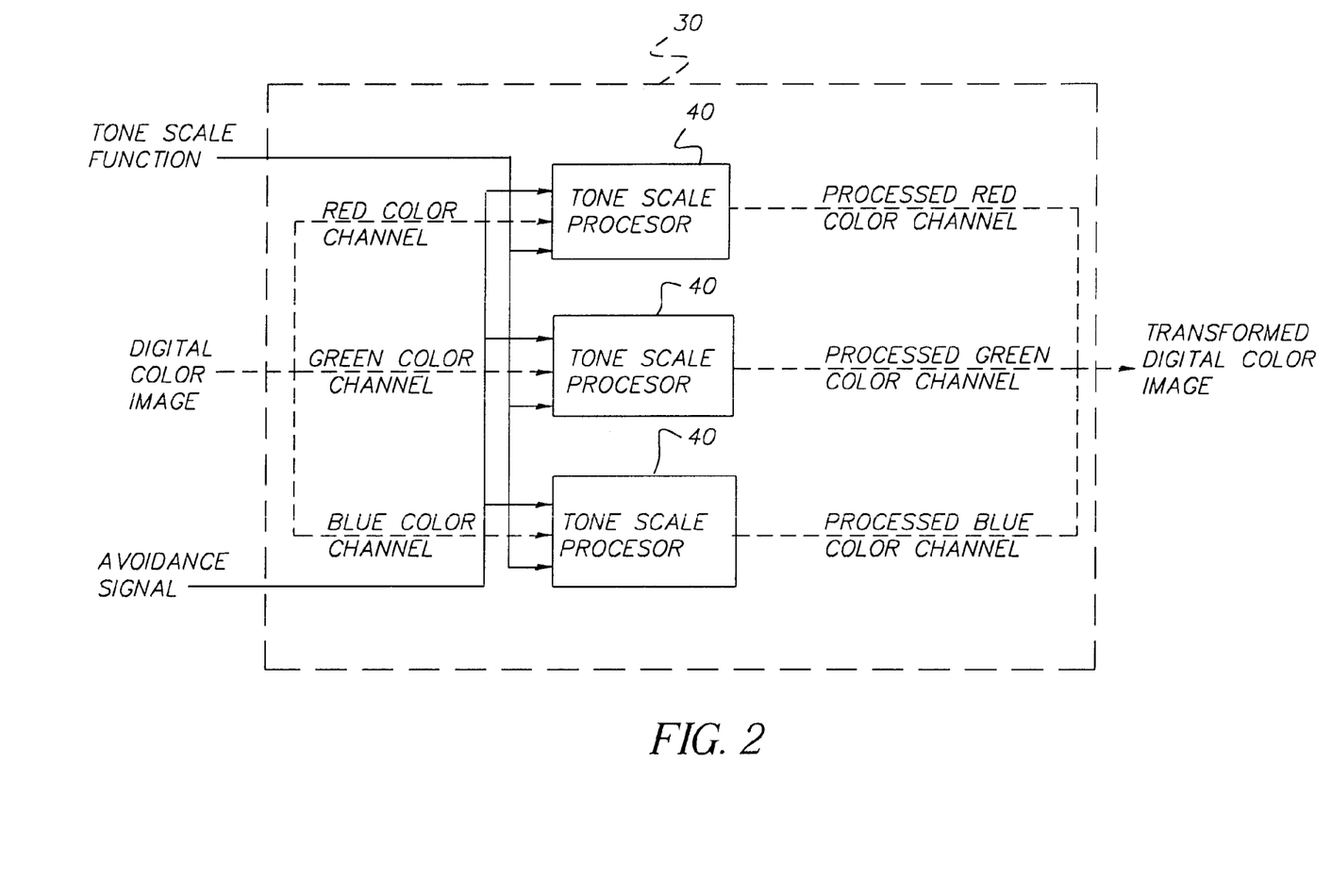
FIG. 2 is an detailed view of the tri-channel processor of FIG. 1.

Referring to FIG. 2, there is illustrated a diagram of the multi-channel processor 30 of FIG. 1. The red, green, and blue image channels along with a tone scale function are input to a tone scale processor 40 which results in a processed image channels. The collection of processed color channels constitutes the color channels of the transformed digital color image.

It is important to note that depending on the purpose of the tone scale application a single tone scale function may be used for all three color channels or an individual tone scale function may be used for each color channel. For example, the application of a tone scale function for the purposes of preparing a digital color image for a digital printer device often involves a single tone scale function applied to all three color channels. Since the device response is often the same for all three channels, a single tone scale function achieves the desired goal.

When adjusting a digital color image for color balance, usually three different tone scale functions are required. For this case, a red balance tone scale function is sent to the tone scale processor 40 along with the red color channel and the control signal. The green and blue color channels are processed in similar fashion. It is important to note that the same control signal a(L) is used for all three color channels.

Figure 3:
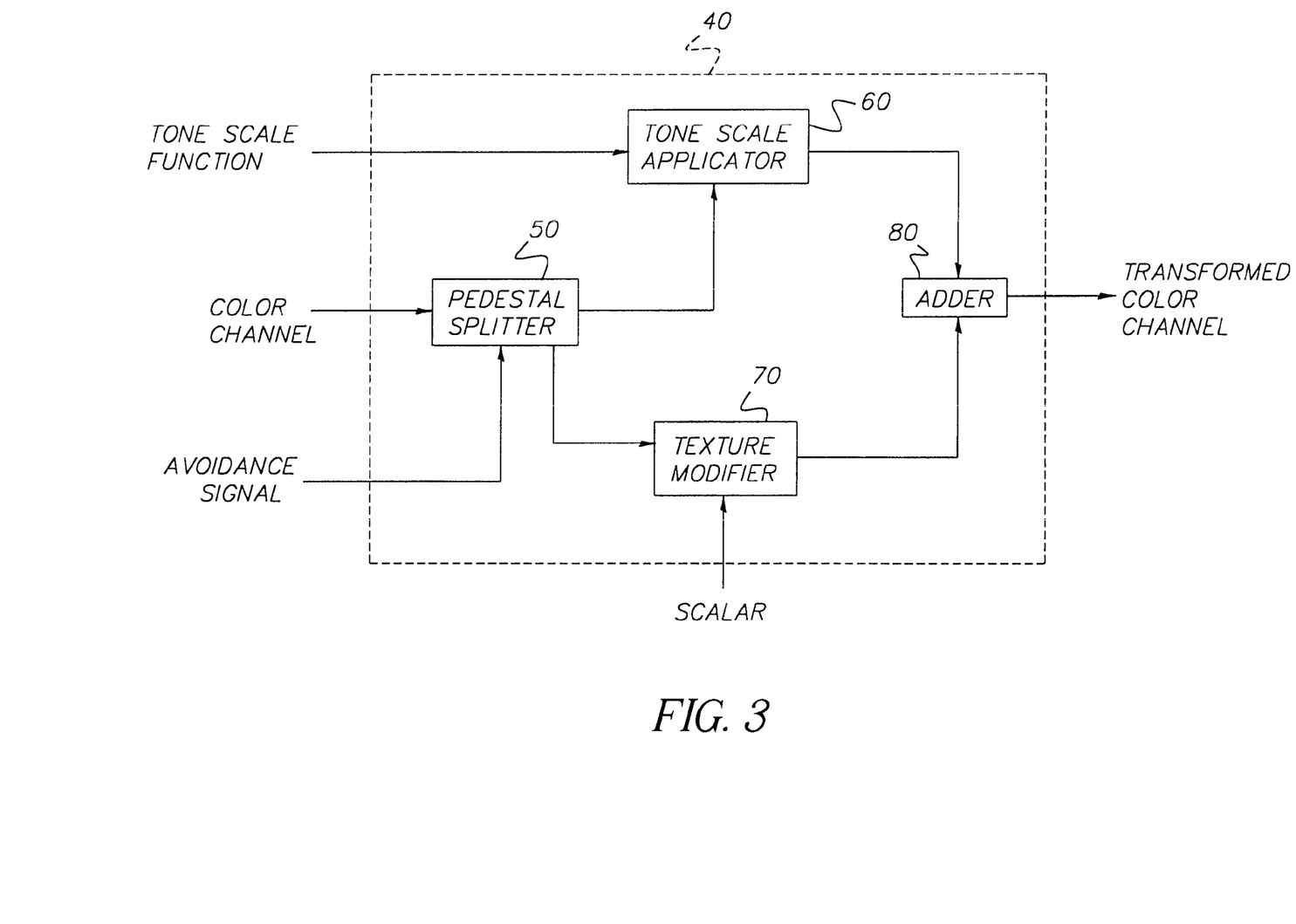
FIG. 3 is a detailed view of the tone scale processor of FIG. 1.
Figure 7:
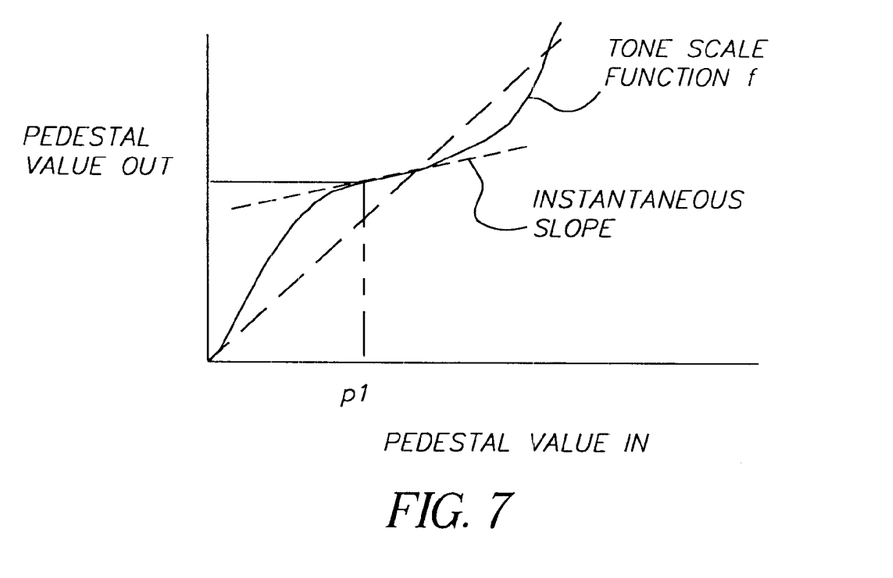
FIG. 7 is an example of a typical tone scale function.

Referring to FIG. 3, therein is illustrated an exploded view of a tone scale processor 40. The digital representation of the color channel is divided into two portions by a pedestal splitter 50—a pedestal signal and a texture signal, as will be described in detail below. The control signal a(L) produced by the avoidance signal generator 20 of FIG. 1 is input to the pedestal splitter 50. A tone scale function is applied to the pedestal signal by a tone scale applicator 60 in order to change the characteristics of the color channel for enhancement. The tone scale function may be applied for the purposes of altering the relative brightness or contrast of the color channel. A tone scale applicator 60 is implemented by application of a look up table (LUT) to an input signal, as is well known in the art. An example tone scale showing a 1 to 1 mapping of input values to output values is illustrated in FIG. 7. The texture signal output from the pedestal splitter 50 may be amplified by the texture modifier 70 if desired, or altered in some other manner as those skilled in the art may desire. This texture modifier 70 may be a multiplication of the texture signal by a scalar constant. The preferred embodiment of this invention sets this scalar constant to 1.0. This leaves the texture signal unaltered. For some applications it may be advantageous to set this scalar constant to a value greater than 1.0. If this is done, the texture signal will be amplified yielding a generally sharper looking image. Similarly, if the scalar constant is set to a value less than 1.0 the texture signal will be diminished resulting in a less sharp image. The modified texture signal and the modified pedestal signal are then summed together by an adder 80, forming a transformed color channel. The addition of two signals by an adder 80 is well known in the art, and will not be further discussed.

Figure 4:
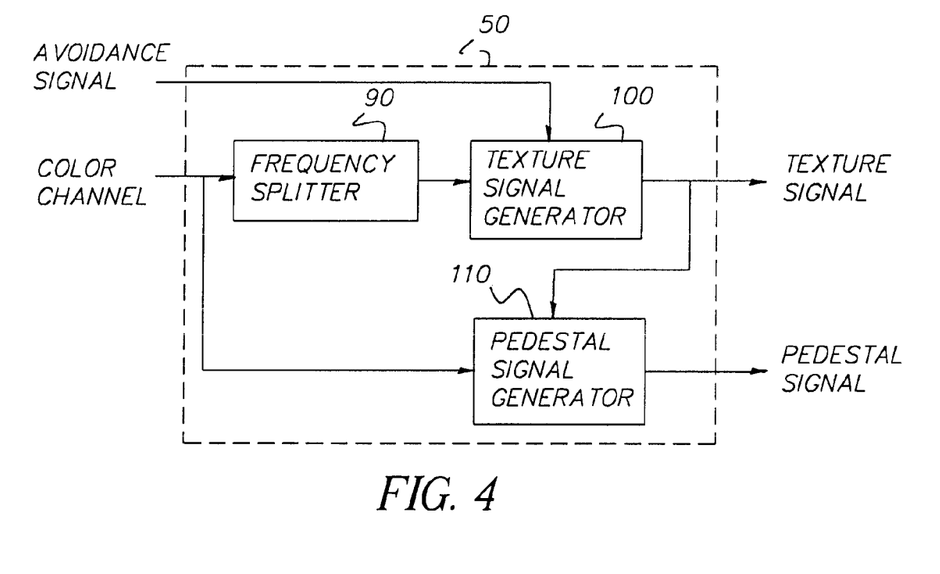
FIG. 4 is an detailed view of the pedestal splitter of FIG. 3.

Referring to FIG. 4, therein is illustrated an exploded view of a pedestal splitter 50. The color channel input into the pedestal splitter 50 is split into a high pass signal and a low pass signal by a frequency splitter 90 preferably with a Gaussian filter with a standard deviation (sigma) of 2.5 pixels. The preferred value of the standard deviation of the Gaussian filter may vary with image size. The value of 2.5 pixels for the sigma value was derived by optimizing the present invention with 1024 by 1536 pixel size images. This Gaussian filter is a two dimensional circularly symmetric low pass filter whose filter coefficients may be derived by the following formula which is well known in the art:

$$G(i,j)=1/(\text{sigma sqrt}(2\pi))\exp[-(i^2+j^2)/(2\text{sigma}^2)]$$

Where G(i,j)=the Gaussian filter coefficient at the (i,j) th pixel

Sigma=the standard deviation of the Gaussian filter (2.5)

$\pi$=the constant approximately 3.1415 . . .

The texture signal generator 100 receives the high pass signal and the avoidance signal a(L). The high pass signal and the avoidance signal a(L) are multiplied therein for producing a texture signal. The pedestal generator 110 receives the original color channel and the texture signal and subtracts the texture signal from the color channel producing a pedestal signal.

Figure 5:
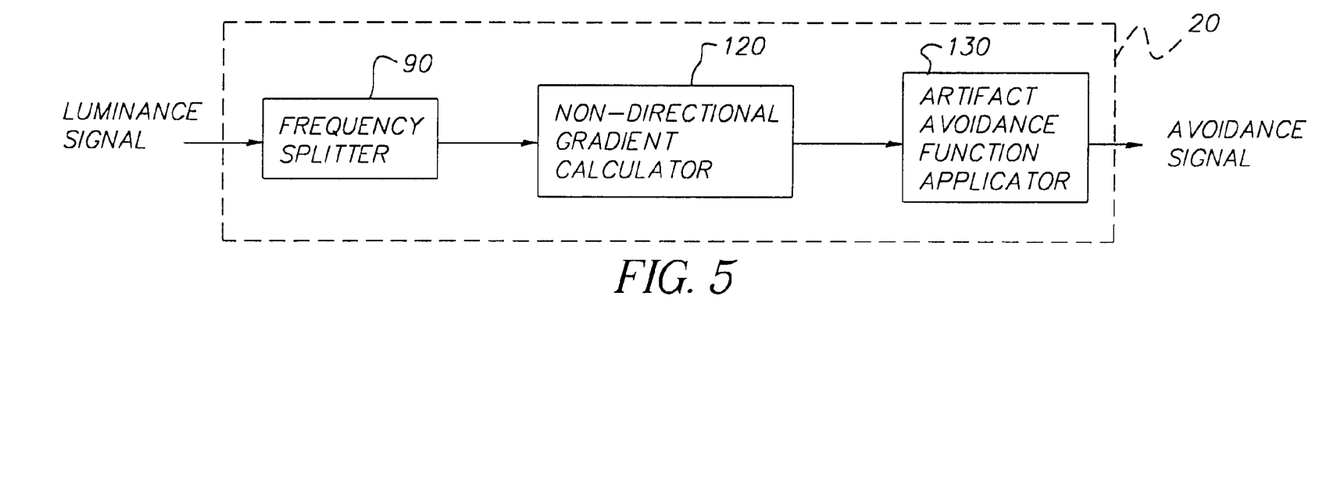
FIG. 5 is an detailed view of the avoidance signal generator of FIG. 1.

Referring to FIG. 5, there is illustrated an exploded block diagram of the avoidance signal generator 20. The luminance signal is fed to a frequency splitter 90 producing a low pass and high pass signal. The high pass signal is discarded while the low pass signal is fed to a non-directional gradient calculator 120 for producing a non-directional gradient signal. This calculation is performed by first calculating the difference between the pixel and its upper vertical neighbor, as well as the difference between the pixel and its horizontal neighbor to the right. The non-directional squared gradient is calculated by taking the sum of the squares of these two differences. The non-directional squared gradient signal is then mapped by an artifact avoidance function applicator 130 to produce an artifact avoidance signal a(L) as the output of the avoidance signal generator 20.

Figure 6:
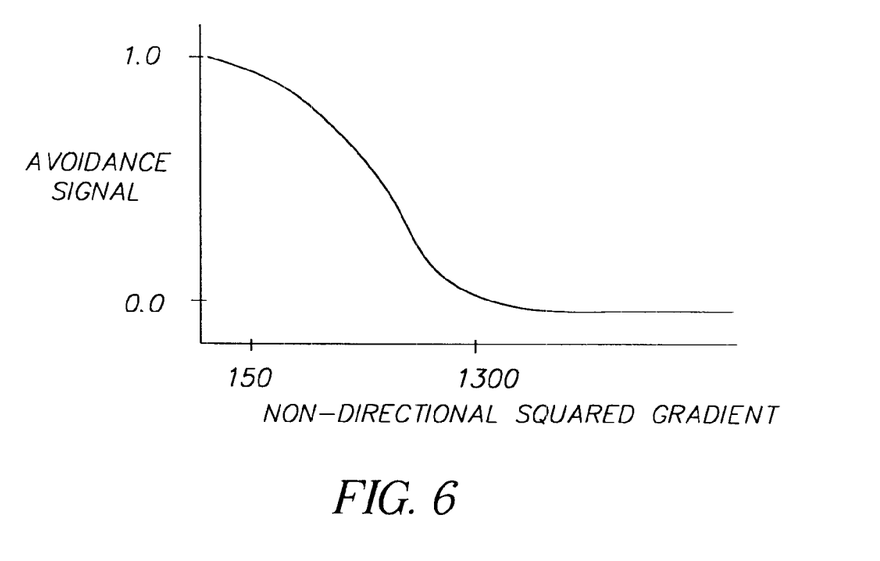
FIG. 6 is the artifact avoidance function.

Referring to FIG. 6, therein is illustrated an example artifact avoidance function av( ). This mapping function is applied by passing the non-directional squared gradient signal, ndg(L), through the artifact avoidance function av( ) formed in the following manner. The preferred embodiment of the present invention utilizes an artifact avoidance function defined by:

$$av(y) = (1/2)(1 + \text{COS}(\pi(y - Co)/(C_1 - Co))$$

for $y > Co$ and $y < C_1$, $$av(y) = 0$$

for $y \geq C_1$ and $av(y) = 1$

The preferred values for Co and $C_1$ will vary according to the range of the input data. The input data range in the images used in the development of this preferred embodiment ranged from 0 to 4095. In this case, the preferred value for Co is 148, and the preferred value for $C_1$ is 1300. As an alternate method for constructing the artifact avoidance function is described in the following equation:

$$av(y) = 1 - sqrt((y - Co)/(C_1 - Co))$$

$$av(y) = 1 - ((y - Co)/(C_1 - Co))$$

for $y \geq Co$ and $y \leq C_1$, $av(y) = 1$ for $y < Co$, and $av(y) = 0$ for $y > C_1$.

The artifact avoidance signal, a(L), is generated by the artifact avoidance function applicator 130. This is accomplished by applying the artifact avoidance function av( ), to the non-directional gradiant signal ndg(L). The mathematical result is described by the equation:

$$a(L)=av(ndg(L)).$$

The artifact avoidance function is most efficiently implemented as a look-up-table (LUT).

A generalized linear spatial filter is described by the equation $$y_{ij} = \Sigma c_{mn} x_{mn}$$

where the $x_{mn}$ values represent local pixel values surrounding the $ij^{th}$ pixel and the $c_{mn}$ values represent numerical coefficients that do not depend on the pixel values $x_{mn}$. A non-linear spatial filter herein described shall be defined as a spatial filter which can not be described by the linear spatial filter equation. The output of applying a generalized control signal to an input signal bears a multiplicative relationship to the input signal. An example of applying a control signal is given by the equation:

$$y_{ij} = a_{ij} x_{ij}$$

where the $x_{ij}$ values represent the input signal $ij^{th}$ pixel values and the $a_{ij}$ values represent the $ij^{th}$ pixel values of the control signal. The result of applying a control signal to an input signal falls into the general category of a non-linear spatial filter if the control signal is derived from a spatial filtered version of the input signal. The avoidance signal a(L) is an example of a control signal created from a spatially filtered version of the luminance signal. The texture signal q(x) described in the preferred embodiment is an example of a non-linear spatial filter produced with the application of a control signal to the high pass signal.

Figure 8:
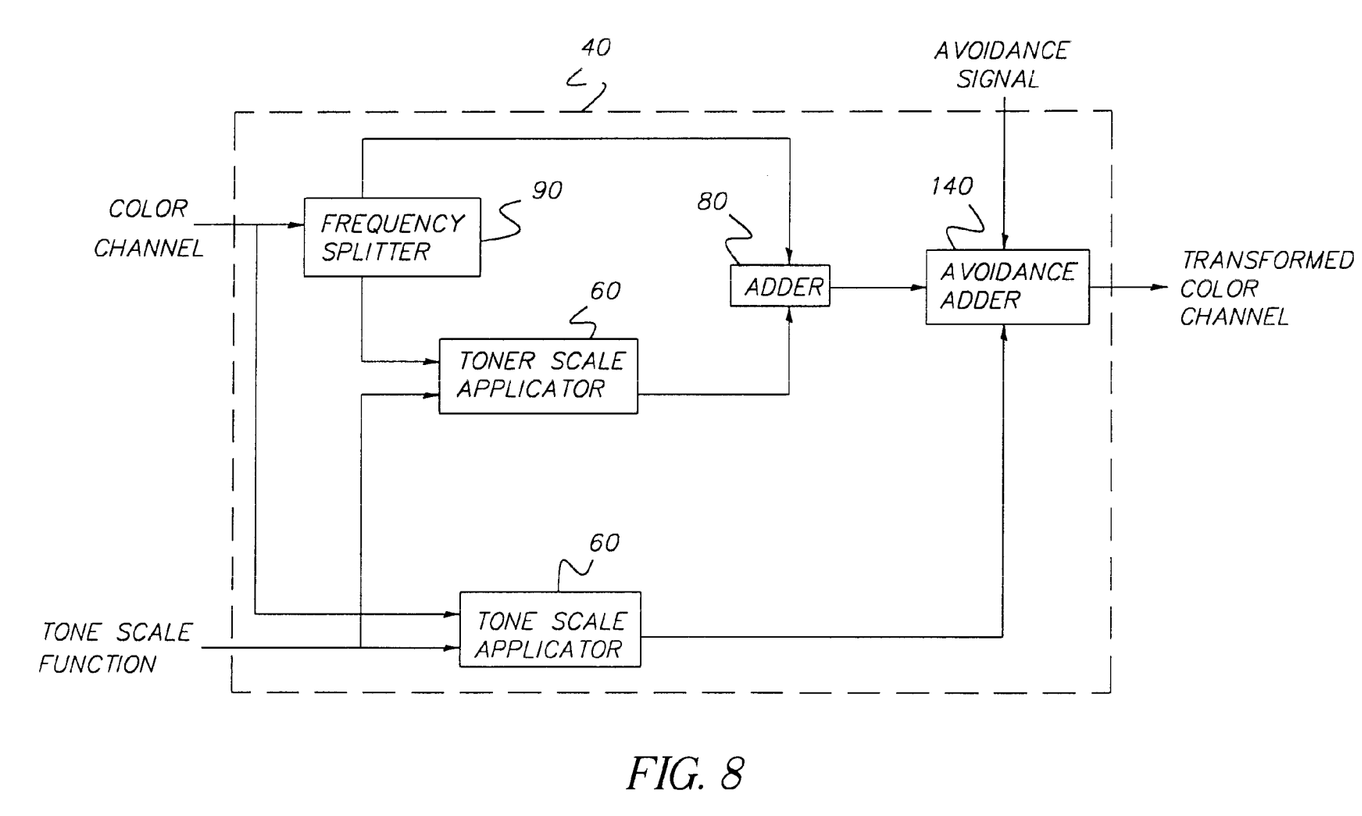
FIG. 8 is an alternative embodiment of the present invention.

Referring to FIG. 8, there is illustrated an alternative configuration of the tone scale processor 40. In this configuration, the color channel is passed to a frequency splitter 90, creating a low pass signal and a high pass signal from the original color channel. In this regard, the low pass signal is then passed through a tone scale applicator 60. The high pass signal is then added to the tone scaled low pass signal with an adder 80.

Again referring to FIG. 8, there is also illustrated that the color channel is input to a tone scale applicator 60. The signal output of this tone scale applicator 60 is applied to the (1−a(L)) input of the avoidance adder 140, to be described in detail below. The output of the adder 80 is applied to the (a(L)) input of the avoidance adder 140. After all of the image pixels have been processed in this manner, the array of pixels represented by the output of the avoidance adder 140 is a color channel with an adjusted tone scale retaining the sharpness of the original color channel with minimal artifacts. This output color channel, when rendered to an output device by any method well known in the art, is visually similar to the output of the preferred embodiment.

An avoidance adder 140 requires three inputs: 2 signals to be summed, and the artifact avoidance signal a(L) provided by the output of the avoidance signal generator 20. The two signals to be summed undergo a transformation such that one of the signals to be summed is multiplied by (a(L)), and the other is multiplied by (1−a(L)). The two transformed signals are then added. The signal input which is scaled by (a(L)) is known as the "(a(L)) input" of the avoidance adder 130 and the signal input which is scaled by (1−a(L)) is known as the "(1−a(L))" input of the avoidance adder 140. If S1 and S2 are the signals to be summed with an avoidance adder 140, the result of which is A, the foregoing may be reduced to an algebraic expression:

$$A = (a(L))(S1) + (1-a(L))(S2)$$

Mathematics:

The final processed pixel of the preferred embodiment may also be represented in functional form:

$$t(x) = [x - [g(x) + a(L)h(x)]] + f(g(x) + a(L)h(x)) \quad (1)$$

Where:
 x = the input color channel
 t(x) = transformed color channel
 g(x) = a low-pass filtered version of x
 h(x) = a high-pass filtered version of x. i.e. h(x) = x−g(x)
 f( ) = a tone scale function applied to either a color channel
 a(L) = the artifact avoidance signal (the control signal)

The artifact avoidance signal a(L) is 1 for pixels in regions of the image which are generally flat (i.e. regions of the image where U.S. Pat. No. 5,012,333 does not produce artifacts.) The signal a(L) becomes 0 for pixels in regions of the image that contain high transition edges (i.e. regions of the image where U.S. Pat. No. 5,012,333 produces artifacts.) The signal a(L) may take on any value within the range of 0.0 to 1.0 depending upon the structure of the local region of the image.

At this point, it becomes useful to make several approximations. The first is that with the nearly linear tone scale functions which are common to image processing, $$g(f(x)) = f(g(x)), \quad (2)$$

approximately.

Secondly, in the case where a tone scale f(x) is applied to a signal x, the result is approximately:

$$f(x) = f(g(x)) + f'(g(x)) * (h(x)) \quad (3)$$

Because of the nearly linear (slowly varying second derivative) nature of most tone scales, the application of a tone scale to an image signal is nearly equivalent to applying the tone scale to the low-pass of the color channel, and scaling the high-pass of the original color channel by the slope of the tone scale function, evaluated at low-pass of the original color channel.

The third approximation follows directly from the first and second approximations.

$$f'(g(x)) * (h(x)) = h(f(x)) \quad (4)$$

Thus, if the equation summarizing the preferred embodiment is evaluated with the three approximations, the resulting approximation for the output pixel value in relatively flat regions (a(L)=1) becomes:

$$t(x) = f(g(x)) + h(x)$$

This result implies that in relatively flat regions of the image, the detail signal of the processed pixel is equal to the detail signal of the original (h(x)), but the contrast of the low-pass signal has been modified by f(x). Likewise, when the equation is simplified with the assumption that the pixel to be processed is near a high transition edge (a(L)=0), $$t(x) = f(x)$$

This result implies that the processed version of the original pixels is only a function of the original pixel values and the tone scale function in regions near high transition edges. This result prevents the occurrence of artifacts at the edge regions.

For pixels with an intermediate value of a(L),(0<a(L)<1), the processed pixel will be bounded by f(x) and f(g(x))+h(x).

In summary, the method of the current invention allows a tone scale function to be applied to an image in such a way that the detail from the original digital color image is preserved, except in those regions where preservation of the detail would produce unnatural artifacts. In these regions, the tone scale function is applied to the original pixel to produce the final output pixel.

Many other flow diagrams may be constructed which will produce a result that, when evaluated with the three approximations, will be:

$$t(x) = f(g(x)) + h(x) \quad \text{for } (a(L) = 1)$$
$$t(x) = f(x) \quad \text{for } (a(L) = 0)$$

These flow diagrams for alternative tone scale processors (represented by 40) may appear quite different from the one described by the preferred embodiment, but utilize the same components of an avoidance signal, frequency decomposition by spatial filtering, and a tone scale function. The images processed with these various methods often contain small numerical differences (because of the approximations), but produce results that are visually comparable.

For example, the alternative embodiment shown in FIG. 8 may be written algebraically from the flow diagram as:

$$t(x)=(1-a(L))f(x)+a(L)[f(g(x)+h(x))]$$

This equation may be evaluated with a(L)=1.0 (i.e. flat regions of the color channel) and with a(L)=0 (i.e. edge regions of the image) by the three approximations (equations (2), (3), and (4)) to yield:

$$t(x) = f(g(x)) + h(x) \quad \text{for } (a(L) = 1)$$
$$t(x) = f(x) \quad \text{for } (a(L) = 0)$$

Thus, the alternative embodiment of the present invention is similar (within the limits of the mathematical approximations) to the preferred embodiment.

The invention has been described with reference to a preferred embodiment. However, it will be appreciated that variations and modifications can be effected by a person of ordinary skill in the art without departing from the scope of the invention.

What is claimed is:

1. A method for preserving detail when adjusting tone scale of a digital color image, the method comprising:
    (a) receiving a digital color image having at least two color channels;
    (b) providing a tone scale function for adjusting the tone scale of the digital color image;
    (c) generating a luminance signal from the digital color image;
    (d) generating a control signal from a spatially filtered version of the luminance signal; and
    (e) using the tone scale function and the control signal applied to each color channel of the digital color image to produce an enhanced digital color image, wherein a high pass and low pass signal are generated for each color channel and at least two non-linear spatial filtered versions of each color channel are generated from the high pass signal, the low pass signal, the control signal, and the original color channels.

2. The method as in claim 1, wherein step (e) further includes generating enhanced color channels by the application of the tone scale function to one of the non-linear spatial filtered versions of each color channel.

3. The method as in claim 2, wherein step (e) further includes modifying the remaining non-linear spatial filtered signals.

4. A method for preserving detail when adjusting tone scale of a digital color image, the method comprising:
    (a) receiving a digital color image having at least two color channels;
    (b) providing a plurality of tone scale functions, one for each color channel, for adjusting the tone scale of the digital color image;
    (c) generating a luminance signal from the digital color image;
    (d) generating a control signal derived from the luminance signal; and
    (e) respectively applying each tone scale function and the control signal to the respective color channel of the digital color image to produce an enhanced digital color image, wherein a high pass and low pass signal are generated for each color channel and at least two non-linear spatial filtered versions of each color channel are generated from the high pass signal, the low pass signal, the control signal, and the original color channels.

5. The method as in claim 4, wherein step (e) further includes generating enhanced color channels by the application of the respective tone scale functions to one of the non-linear spatial filtered versions of each color channel.

6. The method as in claim 5, wherein step (e) further includes modifying the remaining non-linear spatial filtered signals.

* * * * *